United States Patent
Whitehead, Jr. et al.

(10) Patent No.: US 7,139,112 B2
(45) Date of Patent: Nov. 21, 2006

(54) SPATIAL LIGHT MODULATOR AND METHOD FOR COLOR MANAGEMENT

(75) Inventors: Anthony Joseph Whitehead, Jr., Hsin-Chu (TW); Ta-Shuang Kuan, Hsin-Chu Hsien (TW); Chia-Tsung Chan, Tao-Yuan Hsien (TW); Chia-Te Lin, Chia-Yi Hsien (TW)

(73) Assignee: United Microdisplay Optronics Corp., Hsin-Chu (TW)

( * ) Notice: Subject to any disclaimer, the term of this patent is extended or adjusted under 35 U.S.C. 154(b) by 0 days.

(21) Appl. No.: 10/904,155

(22) Filed: Oct. 27, 2004

(65) Prior Publication Data

US 2006/0087713 A1    Apr. 27, 2006

(51) Int. Cl.
*G02F 26/00* (2006.01)

(52) U.S. Cl. ........................................ 359/291; 359/254

(58) Field of Classification Search ............... 359/254, 359/253, 237, 291, 290, 292; 345/613, 694, 345/695, 696; 349/143–146, 110
See application file for complete search history.

(56) References Cited

U.S. PATENT DOCUMENTS

| | | | | |
|---|---|---|---|---|
| 5,868,480 A | * | 2/1999 | Zeinali | 353/31 |
| 5,953,148 A | * | 9/1999 | Moseley et al. | 359/237 |
| 6,008,820 A | * | 12/1999 | Chauvin et al. | 345/502 |

* cited by examiner

*Primary Examiner*—Hung Xuan Dang
*Assistant Examiner*—Tuyen Tra
(74) *Attorney, Agent, or Firm*—Winston Hsu

(57) ABSTRACT

A SLM includes a pixel array. The pixel array contains a plurality of quadrilateral pixels with the same size, wherein an interior angle of each of the quadrilateral pixels is an acute angle. Each of the quadrilateral pixels further contains a first subpixel, a second subpixel, and a third subpixel.

40 Claims, 9 Drawing Sheets

SPATIAL LIGHT MODULATOR AND METHOD FOR COLOR MANAGEMENT

BACKGROUND OF INVENTION

1. Field of the Invention

The invention relates to a spatial light modulator (SLM) and a method for color management thereof, and more particularly, to a SLM and a method for color management thereof through adjusting shapes and arrangements of pixels and subpixels.

2. Description of the Prior Art

SLM is an application of the photoelectric system, which has the advantages of adjusting wavelengths, phases, and polarization of lights, and can be applied to optical signal treatments, amplifying images, and transferring incoherent lights into coherent lights. Accordingly, with the arrival of the digital age, the use of SLMs has become more and more popular in every field. A liquid crystal on silicon (LCOS) display is one kind of SLM that combines the technologies of semiconductors and LCDs. The LCOS display can provide images with high resolution and high lightness. In addition, the LCOS display has a structure simpler than other kinds of SLMs, so that the LCOS display has a potential of low cost and has become popular in the digital projection field.

The main structure of an LCOS display includes a light source module, a LCOS panel, and a color separation and combination optical system. Generally speaking, the LCOS display can be divided into three-panel LCOS displays and single-panel LCOS displays according to the type of optical engine. The three-panel type optical engine separates lights generated from light source into red, blue, and green lights through plurality of prisms, projects those lights into three separated LCOS panels respectively, and combines those three lights from LCOS panels to form colored images. The single-panel type optical engine utilizes a color wheel to form red, blue, and green lights sequentially from white lights, and synchronizes the three kinds of lights with single-colored images, the red, blue, and green images, of the LCOS panel formed by driving programs so as to produce color-separated images sequentially. Since human eyes have the persistence of vision, people can see colored images from the projected images.

Please refer to FIG. 1, which is a schematic diagram of a portion of an LCOS panel 10 according to the prior art. The LCOS panel 10 comprises pluralities of rectangular pixels 12 arranged in a pixel array. When the pixel transistors (not shown) positioned on the substrate of the LCOS panel 10 are opened, the corresponding liquid crystal molecules twist according to driving signals so that light can pass through the liquid crystal materials to create images. Accordingly, a conventional LCOS panel only reflects lights with a single color depending on the driving signals of pixels but cannot provide the functionality of managing colors.

On the other hand, in a conventional SLM, the pixels of the pixel array are all rectangular. Please refer to FIG. 2, which is an enlarged view of the pixel shown in FIG. 1. The conventional pixel 40 has a rectangular shape. Therefore, when the red, blue, and green subpixels are positioned in the conventional pixel 40, the conventional subpixels have to be designed as rectangular shapes and all have the same size, as the subpixels 42, 44, 46 show in FIG. 2. Taking the subpixel 42 as an example, a dotted line connecting the four vertexes of the rectangular subpixel 42 approximately forms an ellipse. Consequently, the areas of the rectangular subpixels 42, 44, 46 are not circular, and therefore the conventional subpixels 42, 44, 46 cannot provide either preferable images or the functionality of color management according to the color and image requirements of manufacturers.

SUMMARY OF INVENTION

It is therefore a primary objective of the claimed invention to provide an SLM and a method for color management through changing the shapes of pixels and positioning subpixels with different shapes to solve the above-mentioned problem.

According to the claimed invention, the present invention SLM comprises a plurality of quadrilateral pixels arranged in a pixel array, wherein each of the quadrilateral pixels has the same size and has an interior angle that is an acute angle. Each of the quadrilateral pixels further comprises a first subpixel, a second subpixel, and a third subpixel.

According to the claimed invention, the present invention further provides a method for color management of a SLM. First, a plurality of pixels with the same sizes and shapes are positioned in the SLM, which are arranged in a pixel array, and a first subpixel, a second subpixel, and a third subpixel are positioned in each of the pixels, wherein the first, the second, and the third subpixels represent one of the optical fundamental colors. Then, the shapes of the pixels are adjusted according to a color temperature requirement of the SLM provided that the adjusted shapes of the pixels are all the same, and the shapes and areas of the first, the second, and the third subpixels are then adjusted according to the color temperature requirement of the SLM. After that, a plurality of color filters are positioned in the SLM corresponding to the first, the second, and the third subpixels in the SLM, so that each of the first, the second, and the third subpixels displays one of the optical fundamental colors when the SLM is operating.

It is an advantage of the claimed invention that the pixels of the SLM have a parallelogram shape or a trapezoid shape, so that each of the subpixels positioned in the pixels can be designed to have a shape similar to a circle so that the SLM can produce display images with preferable colors. Furthermore, the claimed invention provides a method through designing the red, blue, and green subpixels with different shapes and areas to reach the goal of color management of the SLM.

These and other objectives of the present invention will no doubt become obvious to those of ordinary skill in the art after having read the following detailed description of the preferred embodiment that is illustrated in the various figures and drawings.

DETAILED DESCRIPTION

Figure 3:
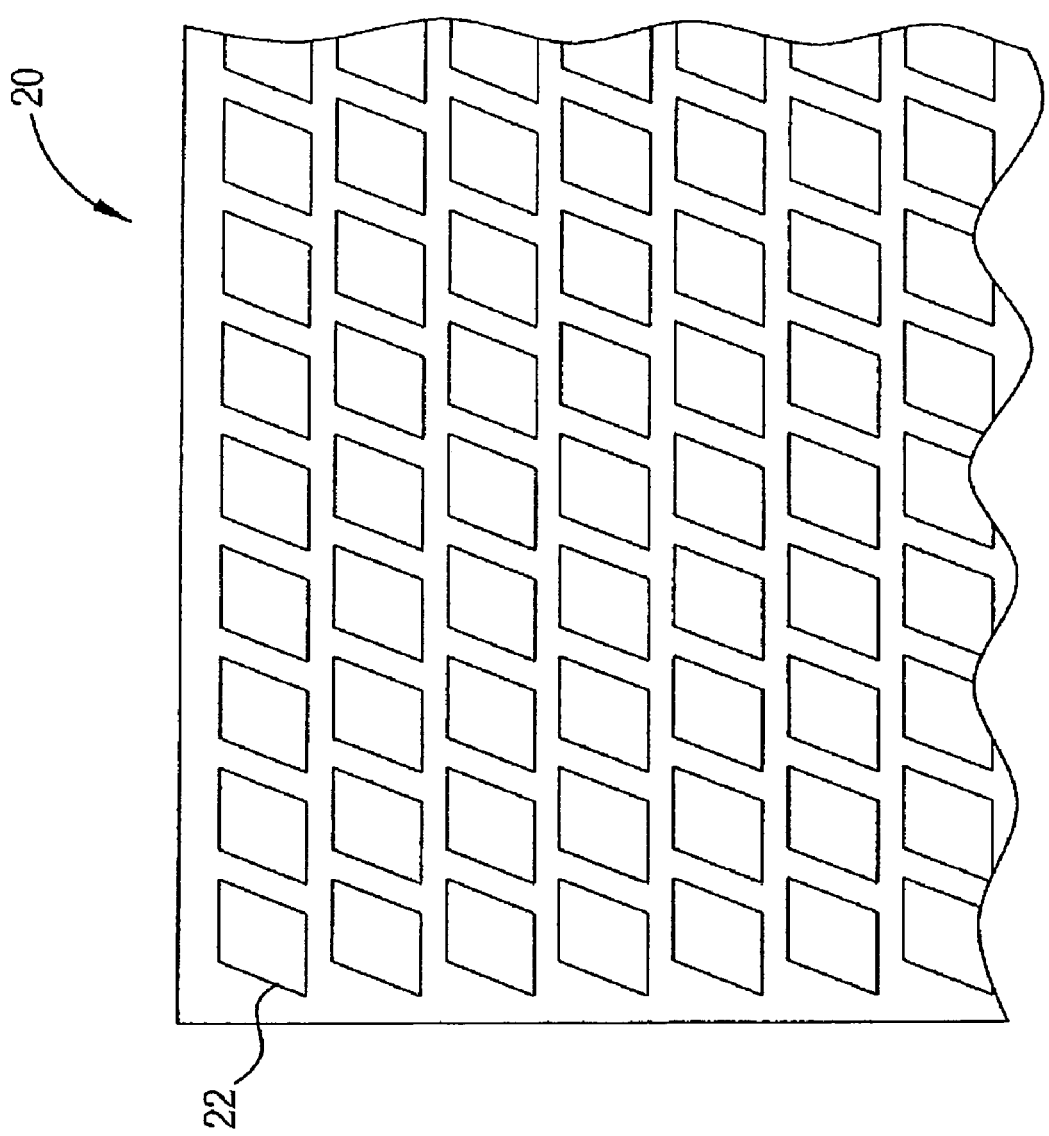
FIG. 3 is a schematic diagram of a portion of an LCOS panel according to the present invention.
Figure 4:
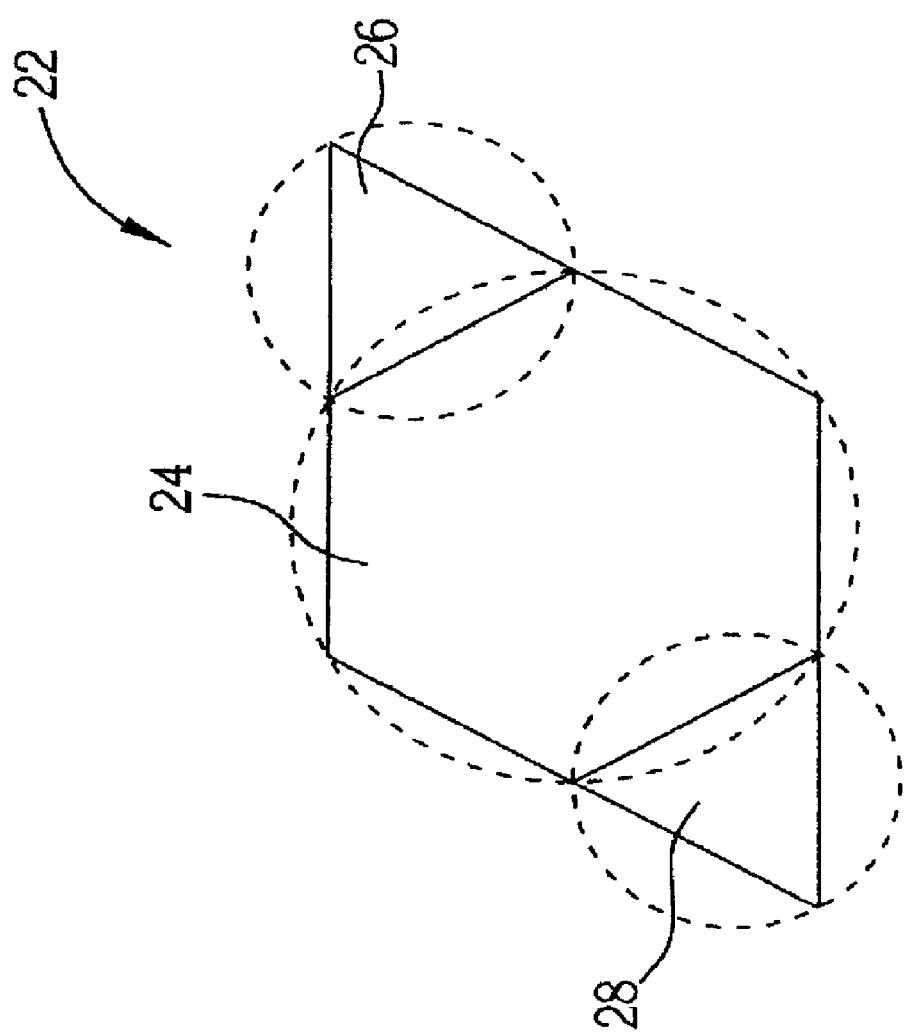
FIGS. 4–5 are enlarged views of the pixel shown in FIG. 3.
Figure 5:
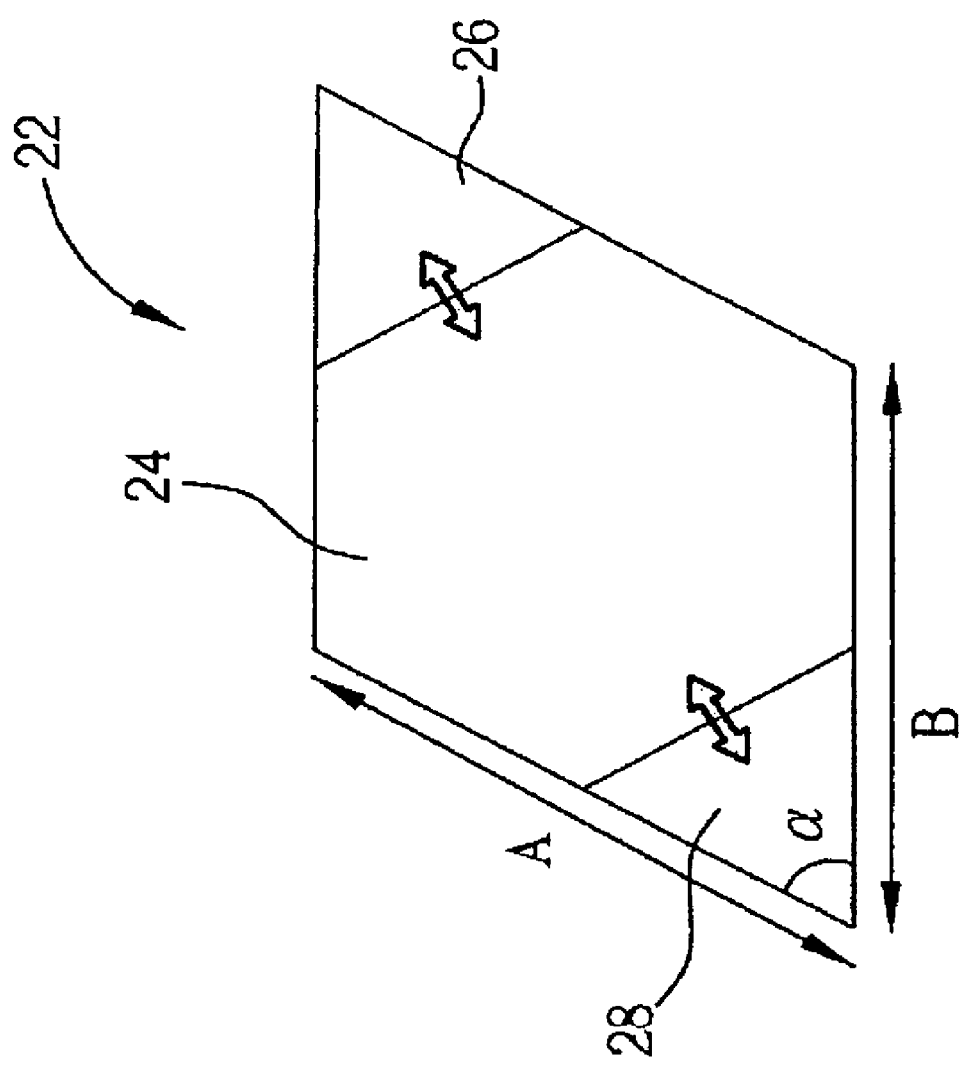
Figure 6:
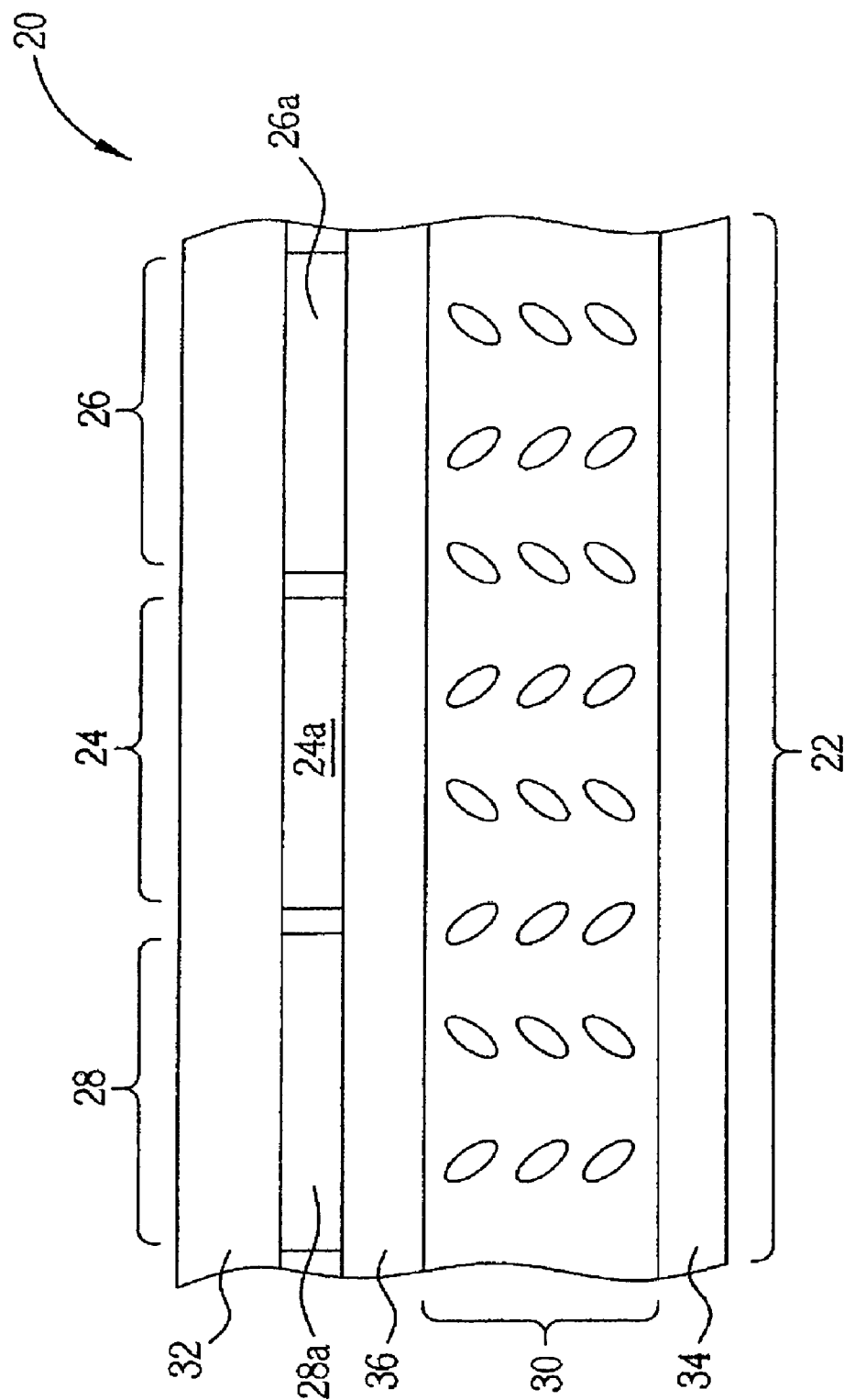
FIG. 6 is a section view of the pixel shown in FIG. 4.

Please refer to FIGS. 3–6. FIG. 3 is a schematic diagram of a portion of a display panel 20 according to the present invention. FIGS. 4–5 are enlarged views of one of the pixels shown 22 in FIG. 3. FIG. 6 is a section view of the pixel 22 shown in FIG. 4. In this embodiment, the SLM is an LCOS display. As shown in FIG. 3, the display panel 20 comprises a plurality of pixels 22 with the same sizes and shapes arranged in a pixel array, and the pixels 22 have a parallelogram shape.

Each of the pixels 22 of the present invention SLM comprises three subpixels 24, 26, 28 representing one of the optical fundamental colors, red, blue, and green. The display panel 20 further comprises a plurality of red, blue, and green color filters 24a, 26a, 28a corresponding to the subpixels 24, 26, 28 so that each of the subpixels 24, 26, 28 display one of the optical fundamental colors simultaneously when the present invention SLM is operating. Accordingly, the present invention SLM can display colored images through a single display panel without color wheels or light separation and combination systems. Therefore, the manufacturing cost and SLM volume can be reduced.

Referring to FIG. 6, the present invention display panel 20 further comprises a semiconductor substrate 34 with pluralities of MOS transistors and pixel electrodes (not shown) thereon, a glass substrate 32 positioned in parallel with and opposite to the semiconductor substrate 34, a liquid crystal molecule layer 30 positioned between the semiconductor substrate 34 and the glass substrate 32, a transparent conductive layer 36 positioned on the liquid crystal molecule layer 30, and a plurality of color filters 24a, 26a, 28a positioned between the transparent conductive layer 36 and the glass substrate 32.

Since the shape of the pixels 22 of the present invention SLM is a parallelogram, the subpixels 24, 26, 28 positioned in the pixels 22 can be designed as different shapes to fully fill each of the pixels 22. In the preferable embodiment of the present invention, the subpixels 26 and 28 have triangular shapes, and the subpixel 24 has a hexagon shape. In this design, the subpixels 24, 26, 28 can have shapes similar to a circular form. As shown in FIG. 4, the vertexes of each of the subpixels 24, 26, 28 are proximately positioned on a corresponding reference circle (as the dotted circles show in FIG. 4), and the centers of the reference circles are positioned in the areas of the corresponding subpixels 24, 26, 28. As a result, the subpixels 24, 26, 28 can supply uniform colors in each of the pixels 22, and the present invention SLM can display preferable images accordingly.

Figure 1:
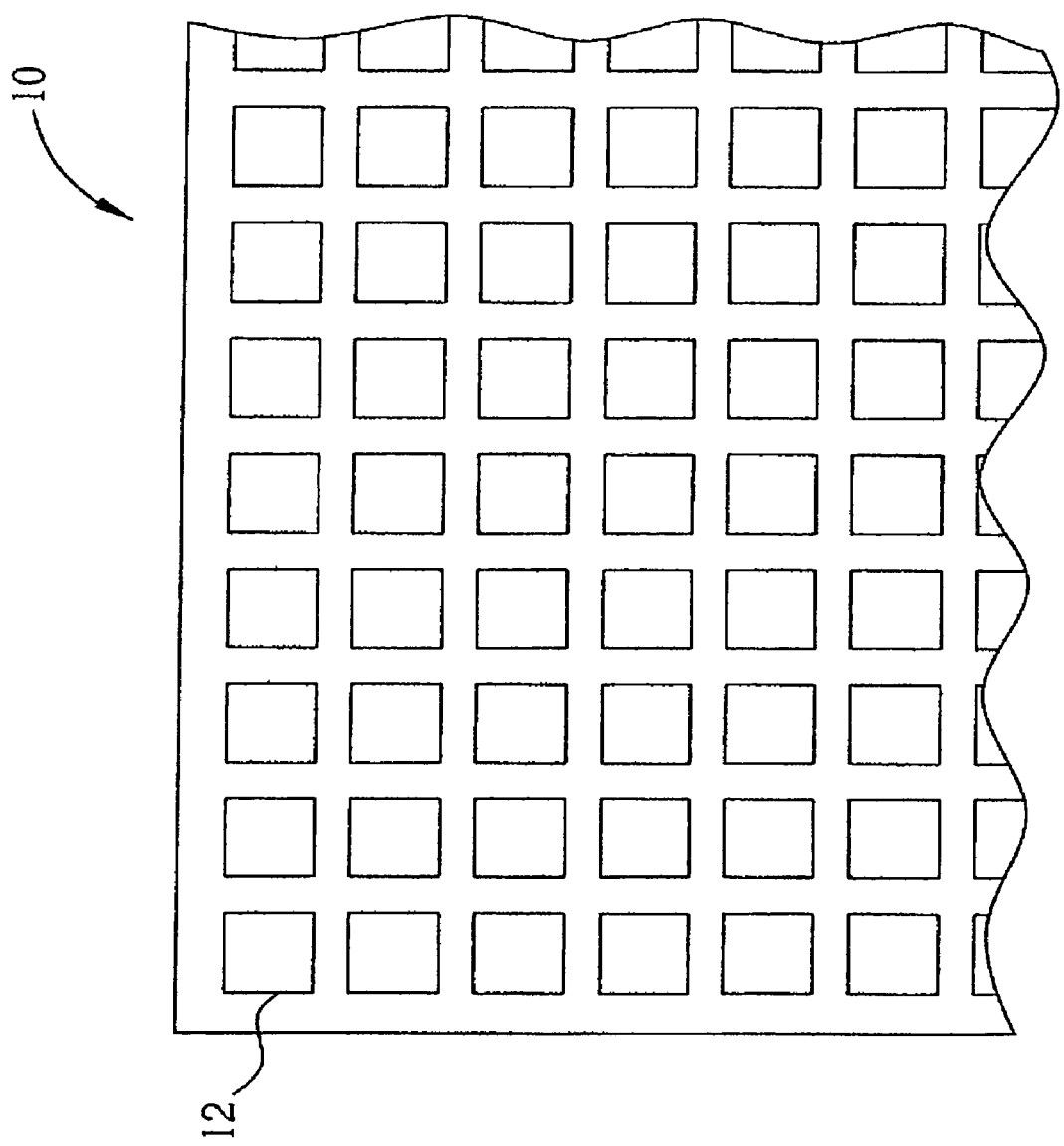
FIG. 1 is a schematic diagram of a portion of an LCOS panel according to the prior art.
Figure 2:
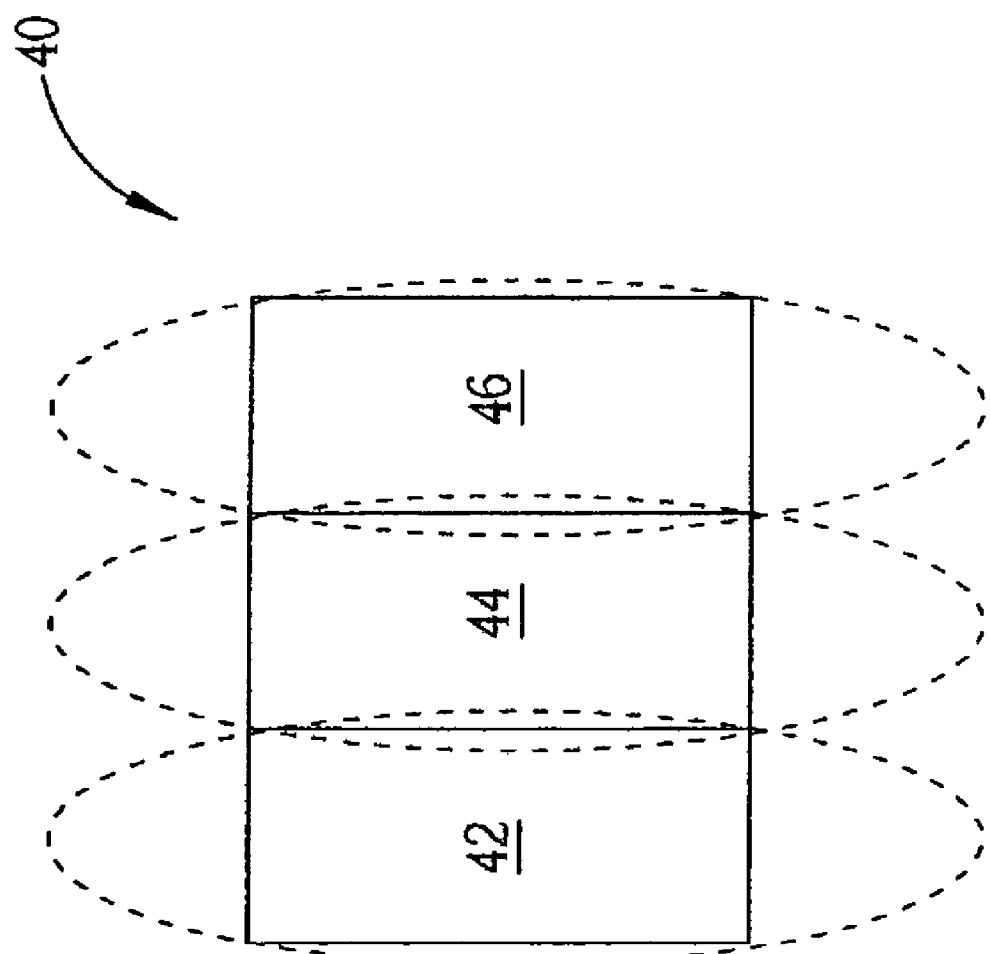
FIG. 2 is an enlarged view of the pixel shown in FIG. 1.
Figure 7:
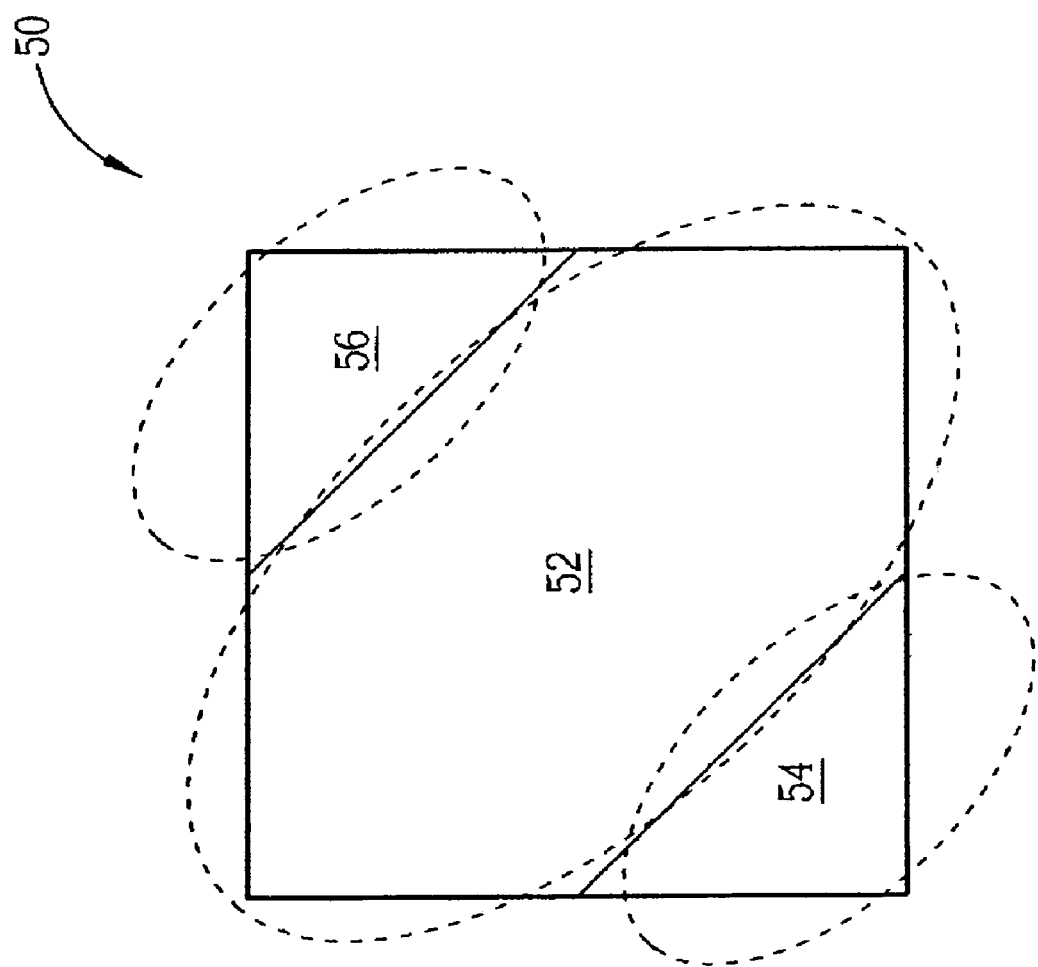
FIG. 7 is an enlarged view of a rectangular pixel.

Regarding the conventional pixels, the shapes of the subpixels positioned in the conventional pixels are limited to its rectangular shape. Please refer to FIG. 7, which is an enlarged view of a rectangular pixel. The conventional pixel 50 has a rectangular shape that is approximately square, and the shapes of the subpixels 52, 54, 56 are designed according to the arrangement of the present invention, which are a hexagon and two triangles. However, the shapes of the subpixels 52, 54, 56 in the rectangular pixel 50 are still similar to ellipses, instead of circles. As a result, comparing FIG. 2, FIG. 4, and FIG. 7, the subpixels in the parallelogram pixels, such as the subpixels 24, 26, 28 in the pixel 22 shown in FIG. 4 of the present invention, have better shapes than that of the subpixels in the rectangular pixel and can create preferable colors and display images.

In addition, the shapes and sizes of the subpixels in the pixels of the present invention SLM display panel can be changed for meeting the color taste of consumers provided that the adjusted shapes of the three subpixels form each pixel so as to manage the color of the SLM for meeting the color temperature requirement of the SLM. As shown in FIG. 5, the pixel 22 has a first side A and a second side B that have an included angle α that is an interior angle of the parallelogram pixel 22. The SLM manufacturer can change the shape of the parallelogram pixel 22 through adjusting the first side A, the second side B, and their included angle α, so that the color temperature requirement can be met when the subpixels 24, 26, 28 have preferable shapes accordingly. In the preferable embodiment of the present invention, the pixel 22 is a diamond-shaped pixel.

Furthermore, for controlling the color temperature of the present invention SLM, the subpixels 24, 26, 28 can also be designed to have different areas. For example, the shapes of the subpixels 24, 26, 28 in the pixel 22 can be adjusted along the direction of the arrows shown in FIG. 5. When the SLM manufacturer wants to design an SLM that displays images with a warm color temperature, the SLM manufacturer can design to make the subpixels 24, 26, 28 have individual preferable areas and shapes through the above-mentioned process and make the red subpixel have the largest area. For example, the SLM manufacturer can position the red color filters corresponding to the subpixel 24 and make the red subpixel 24 have a larger area. For the same reason, the area of the subpixel 24 may be unequal to or larger than the areas of the other two subpixels 26 and 28. Even more, the subpixel 26 may be still larger than the subpixel 28. Similarly, the subpixels 24, 26, 28 can be designed as various shapes to accomplish the object of color management of an SLM by designing the shapes and areas of the subpixels according to the present invention.

Figure 8:
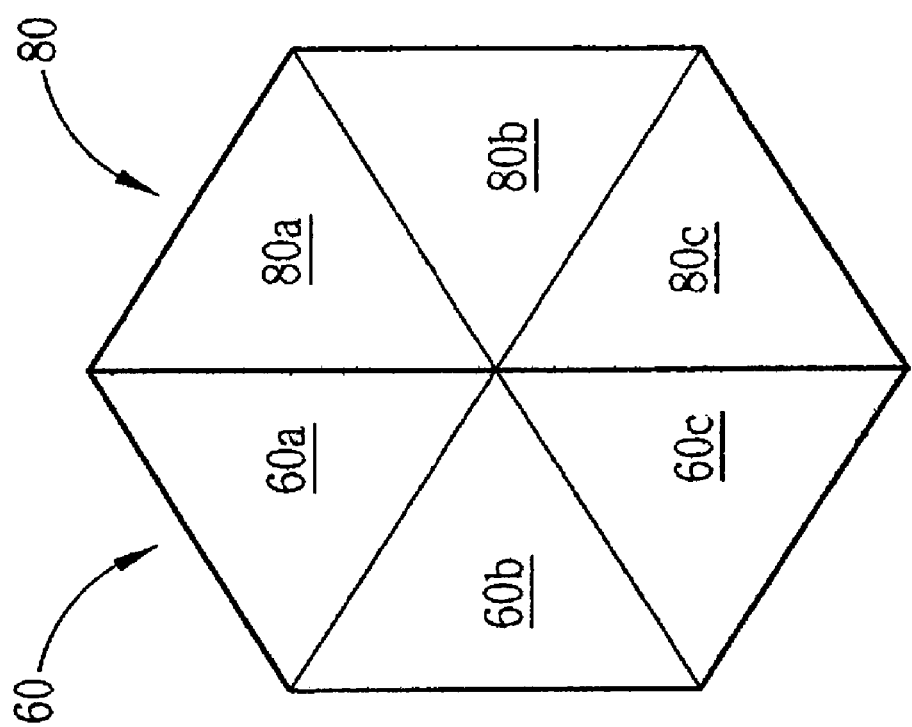
FIG. 8 is an enlarged view of pixels of an SLM of another embodiment according to the present invention.

Please refer to FIG. 8, which is an enlarged view of pixels 60 and 80 of an SLM of another embodiment according to the present invention. The pixels 60 and 80 each have trapezoid shapes, which have three triangular subpixels 60a, 60b, 60c, and three triangular subpixels 80a, 80b, 80c respectively. In FIG. 8, the trapezoid pixels 60 and 80 form a regular hexagon, and all of the subpixels 60a, 60b, 60c, 80a, 80b, 80c are equilateral triangles. Consequently, the subpixels 60a, 60b, 60c, 80a, 80b, 80c all have areas similar to circles for providing preferable displaying colors. In addition, the SLM manufacturers still can adjust the shapes and sizes of the red, blue, and green subpixels according to the color temperature requirement and favorable color tones of the consumers.

Figure 9:
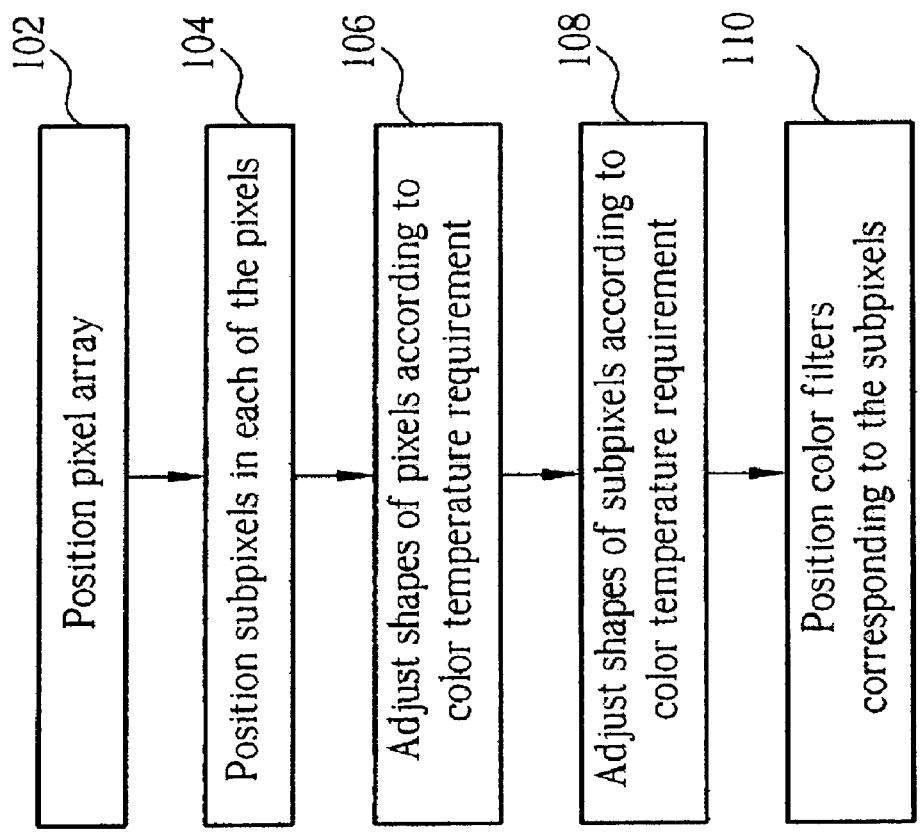
FIG. 9 is a flow chart of a method for color management of an SLM according to the present invention.

To conclude the above description, the present invention provides a method for color management so that the SLM manufactures can produce SLMs satisfying the color tastes of consumers. Please refer to FIG. 9. FIG. 9 is a flow chart of a method for color management of an SLM according to the present invention. The method of the present invention comprises the following steps:

Step 102: Position a plurality of pixels with the same sizes and shapes arranged in a pixel array in the SLM.

Step 104: Position a first subpixel, a second subpixel, and a third subpixel in each of the pixels, wherein the first, the second, and the third subpixels represent one of the optical fundamental colors, red, blue, and green.

Step 106: Adjust shapes of the pixels according to a color temperature requirement of the SLM, wherein the adjusted shapes of the pixels are all the same.

Step 108: Adjust shapes and areas of the first, the second, and the third subpixels according to the color temperature requirement of the SLM.

Step 110: Position a plurality of color filters corresponding to the first, the second, and the third subpixels in the SLM, so that the first, the second, and the third subpixels display one of the optical fundamental colors when the SLM is operating.

In contrast to the prior art, the present invention provides pixels with shapes besides rectangles in the SLM, and further provides a method to design the arrangement of pixels through adjusting the shapes and sizes of the red, blue, and green subpixels, and adjusting the shapes of the pixels in order to meet the color temperature requirement of the SLM and the color taste of consumers. When the arrangement of the subpixels is changed according to the design, only the patterns of the photomasks for forming the color filters have to be changed. Therefore, the present invention method can be performed without changing fabricating processes. Accordingly, the present invention SLM and method can reach the goal of color management through simple processes without extra processes and costs.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A spatial light modulator (SLM) comprising a plurality of quadrilateral pixels arranged in a pixel array, each of the quadrilateral pixels having an interior angle that is an acute angle, and each of the pixels further comprising a first subpixel, a second subpixel, and a third subpixel.

2. The SLM of claim 1, wherein an area of the first subpixel is different from areas of the second and the third subpixels for each of the pixels.

3. The SLM of claim 2, wherein the area of the second subpixel is different from the area of the third subpixel for each of the pixels.

4. The SLM of claim 1, wherein a shape of the first subpixel is different from shapes of the second and the third subpixels for each of the pixels.

5. The SLM of claim 4, wherein the shape of the second subpixel is different from the shape of the third subpixel for each of the pixels.

6. The SLM of claim 1, wherein the pixels are trapezoid pixels.

7. The SLM of claim 6, wherein a shape of each of the first, second, and third subpixels are a triangle.

8. The SLM of claim 1, wherein the pixels are parallelogram pixels.

9. The SLM of claim 8, wherein the pixels are diamond-shaped pixels.

10. The SLM of claim 8, wherein a shape of each of the first subpixels is a hexagon, and shapes of each of the second and each of the third subpixels are triangles.

11. The SLM of claim 1, wherein vertexes of each of the first subpixels, the second subpixels, and the third subpixels are approximately positioned on a corresponding reference circle respectively.

12. The SLM of claim 1 further comprising a plurality of color filters corresponding to each of the first, the second, and the third subpixels, so that each of the first, the second, and the third subpixels are capable of displaying one of the optical fundamental colors when the SLM is operating.

13. The SLM of claim 1, wherein the SLM is a liquid crystal on silicon (LCOS) display.

14. A method of color management of a SLM, the method comprising:
positioning a plurality of pixels with the same sizes and shapes in the SLM, the pixels arranged in a pixel array;
positioning a first subpixel, a second subpixel, and a third subpixel in each of the pixels, wherein the first, the second, and the third subpixels represent one of the optical fundamental colors;
adjusting shapes of the pixels according to a color temperature requirement of the SLM, wherein the adjusted shapes of the pixels are all the same;
adjusting shapes and areas of the first, the second, and the third subpixels according to the color temperature requirement of the SLM; and
positioning a plurality of color filters corresponding to the first, the second, and the third subpixels in the SLM, so that each of the first, the second, and the third subpixels display one of the optical fundamental colors when the SLM is operating.

15. The method of claim 14, wherein the step of adjusting the shapes and areas of the first, the second, and the third subpixels makes the shapes of the first subpixels different from the shapes of the second and the third subpixels.

16. The method of claim 15, wherein the step of adjusting the shapes and areas of the first, the second, and the third subpixels makes the shapes of the second subpixels different from the shapes of the third subpixels.

17. The method of claim 14, wherein the step of adjusting the shapes and areas of the first, the second, and the third subpixels makes the areas of the first subpixels different from the areas of the second and the third subpixels.

18. The method of claim 17, wherein the step of adjusting the shapes and areas of the first, the second, and the third subpixels makes the areas of the second subpixels different from the areas of the third subpixels.

19. The method of claim 14, wherein shapes of the color filters are the same as the shapes of the first, the second, and the third subpixels correspondingly.

20. The method of claim 14, wherein the step of adjusting the shapes of the pixel makes the pixels have a parallelogram shape.

21. The method of claim 20, wherein the pixels are diamond-shaped pixels.

22. The method of claim 20, wherein the parallelogram comprises a first side and a second side adjacent to the first side, and an included angle of the first and the second sides is an interior angle of the parallelogram, which is an acute angle.

23. The method of claim 22 comprising adjusting the interior angle to adjust the shapes of the pixels.

24. The method of claim 22 comprising adjusting the first side and the second side to adjust the shapes of the pixels.

25. The method of claim 20, wherein the shape of each of the first subpixels is a hexagon, and the shapes of each of the second subpixels and each of the third subpixels are triangles.

26. The method of claim 14, wherein the step of adjusting the shapes of the pixels makes the pixels have a trapezoid shape.

27. The method of claim 26, wherein the shapes of the first, the second, and the third subpixels are triangles.

28. The method of claim 14, wherein the step of adjusting the shapes and sizes of the first, the second, and the third subpixels positions the vertexes of each of the first, the second, and the third subpixels in a corresponding reference circle respectively.

29. A spatial light modulator (SLM) comprising a plurality of quadrilateral pixels arranged in a pixel array, each of the quadrilateral pixels having an interior angle that is an acute angle, and each of the pixels further comprising a first subpixel, a second subpixel, and a third subpixel, wherein an area of the first subpixel is different from areas of the second and the third subpixels for each of the pixels.

30. The SLM of claim 29, wherein the area of the second subpixel is different from the area of the third subpixel for each of the pixels.

31. The SLM of claim 29, wherein a shape of the first subpixel is different from shapes of the second and the third subpixels for each of the pixels.

32. The SLM of claim 31, wherein the shape of the second subpixel is different from the shape of the third subpixel for each of the pixels.

33. The SLM of claim 29, wherein the pixels are trapezoid pixels.

34. The SLM of claim 33, wherein a shape of each of the first, second, and third subpixels are a triangle.

35. The SLM of claim 29, wherein the pixels are parallelogram pixels.

36. The SLM of claim 35, wherein the pixels are diamond-shaped pixels.

37. The SLM of claim 35, wherein a shape of each of the first subpixels is a hexagon, and shapes of each of the second and each of the third subpixels are triangles.

38. The SLM of claim 29, wherein vertexes of each of the first subpixels, the second subpixels, and the third subpixels are approximately positioned on a corresponding reference circle respectively.

39. The SLM of claim 29 further comprising a plurality of color filters corresponding to each of the first, the second, and the third subpixels, so that each of the first, the second, and the third subpixels are capable of displaying one of the optical fundamental colors when the SLM is operating.

40. The SLM of claim 29, wherein the SLM is a liquid crystal on silicon (LCOS) display.

* * * * *